3,136,767
PIPERAZINE SALT MANUFACTURE
Simon P. Burns, 5903 Belfast, and Herbert G. Muhlbauer, 2607 Albata Ave., both of Austin, Tex.
No Drawing. Filed May 15, 1963, Ser. No. 280,707
5 Claims. (Cl. 260—268)

This invention relates to an improved method for the manufacture of a piperazine salt. More particularly, this invention relates to an improved method for the manufacture of low color concentrated aqueous solutions of dipiperazine sulfate.

In Anslow U.S. Patent No. 3,019,225, there is disclosed a method for the manufacture of an aqueous solution of dipiperazine sulfate wherein there is added to an aqueous solution of piperazine not more than about 0.5 mole per mole of piperazine of a water soluble sulfate donor to thereby provide dipiperazine sulfate which may be successfully prepared in dilute solution or in concentrated solutions containing as much as 60 grams per 100 ml. of piperazine. The preferred method of manufacturing concentrated aqueous solutions of dipiperazine sulfate as disclosed in the Anslow patent involves the addition of ammonium sulfate to a dilute aqueous solution of piperazine, to thereby provide a dilute aqueous ammoniacal solution of dipiperazine sulfate, followed by distillation to remove excess water (whereby ammonia is removed from the product) and followed further by filtration in the presence of a decolorant (e.g., charcoal) and a filter aid to remove solids. The said Anslow patent also discloses that sulfuric acid may be employed, but that it is not as effective as ammonium sulfate because of discoloration of the final product.

Although the methods disclosed in the said Anslow patent have been generally satisfactory, there has been a need for improvement, particularly where large scale commercial manufacture of a concentrated, low color aqueous solution is involved. Thus, it has been found that the ammonium sulfate manufacturing method mentioned above is not entirely satisfactory with respect to the distillation step, in that distillation at reasonable distillation rates is accompanied by frothing and entrainment due to the presence of ammonia, which results in a loss of desired product. Also, when the distillation step is conducted so as to provide a concentrated solution of dipiperazine sulfate containing in excess of about 48 grams of piperazine per 100 ml. of solution, a serious filtration problem is encountered, both because of low filter rates and because of the comparative ineffectiveness of decolorants, such as charcoal, to remove color-forming impurities from the concentrated solutions.

It has now been surprisingly discovered in accordance with the present invention that the foregoing and other problems may be overcome and the manufacture of concentrated low color aqueous solutions of dipiperazine sulfate significantly improved by a method of manufacture which comprises the steps of:

(1) Adding sulfuric acid (which preferably contains not more than about 100 p.p.m. of dissolved iron) to a dilute aqueous solution of piperazine containing from about 15 to 30 vol. percent excess of water over that desired in the final product;

(2) Filtering a thus-formed dilute aqueous solution of dipiperazine sulfate containing not more than about 46 grams of piperazine per 100 ml. of aqueous solution (e.g., 40 to 45 grams per 100 ml.) in the presence of a solid decolorizing agent; and (3) Adjusting the concentration of dipiperazine sulfate in the thus-filtered aqueous solution to provide an aqueous dipiperazine sulfate product having a Pt-Co color value of less than about 150 and an aqueous piperazine content of more than about 48 grams per 100 ml. of solution.

The final step of the process may be accomplished by distilling the filtered solution to remove excess water, but is preferably accomplished by the addition of further quantites of piperazine and sulfuric acid in a 2:1 mole ratio to provide for the requisite concentration.

It is necessary to the practice of the present invention that the addition of sulfuric acid be accomplished in the absence of air and that the sulfuric acid be added at a temperature of less than about 60° C., such as a temperature within the range of about 20° to about 60° C. It is also highly desirable that the aqueous solution be maintained at temperatures of less than about 60° C. throughout the entire manufacturing process, and for this reason the final distillation step is preferably avoided in preference to the addition of additional sulfuric acid and piperazine.

The starting materials for the present invention are water, sulfuric acid and piperazine. Ordinary well water and commercial grades of both piperazine and sulfuric acid may be employed with satisfactory results. However, it is preferable that the sulfuric acid contain less than about 100 p.p.m. of iron, and still more preferable that the sulfuric acid contain less than about 25 p.p.m. of iron. The sulfuric acid is preferably employed in the form of a concentrated solution, although more dilute solutions of sulfuric acid may be employed if desired.

A total of about two moles of piperazine per mole of sulfuric acid is employed in the process, and it is highly desirable to avoid a concentration of more than about 0.5 mole of sulfuric acid per mole of piperazine at any time during the process in order to prevent the formation of a precipitate of monopiperazine monosulfate.

For example, sulfuric acid may be added in the indicated manner and amount to an aqueous solution of piperazine containing 40 to 45 grams of piperazine per 100 ml. of aqueous solution to provide a dilute dipiperazine sulfate solution that is filtered in the presence of activated carbon and diatomaceous earth or perlite and then concentrated to a dipiperazine sulfate content such that the final product has a piperazine content (based on the piperazine component of the dipiperazine sulfate) of 50 to 60 grams of piperazine per 100 ml. of solution through the addition of concentrated sulfuric acid and piperazine, as described while maintaining the temperature at about 60° C. and while padding with nitrogen or natural gas.

The invention will be further illustrated by the following specific examples, which are given by way of illustration and not as limitation on the scope of this invention.

EXAMPLE I

*Prior Art Method of Preparing Dipiperazine Sulfate*

An aqueous solution of dipiperazine sulfate containing about 50 grams of piperazine per 100 ml. of solution was prepared in commercial equipment in accordance with the preferred method of manufacture disclosed in the Anslow Patent No. 3,019,225, utilizing water, piperazine and ammonium sulfate as starting materials. No attempt was made to exclude air from the process.

The manufacturing procedure involved the addition of ammonium sulfate to a dilute aqueous solution of piperazine to form a dilute aqueous ammoniacal solution of dipiperazine sulfate, distillation of the dilute ammoniacal solution to remove excess water and ammonia to provide an aqueous solution of dipiperazine sulfate containing about 50 grams of piperazine per 100 ml. of solution and filtration of the thus-prepared solution in the presence of activated carbon and diatomaceous earth in order to remove suspended solids.

The distillation was accomplished at an overhead temperature of up to about 105° C. and a kettle temperature of up to about 120° C.

It was found in commercial practice that erratic results were obtained in that there was a loss of piperazine in the distillation step due to frothing and entrainment at reasonable distillation rates and in that an off-color product was frequently obtained at the end of the distillation step which could not be improved by repeated filtration in the presence of activated carbon and diatomaceous earth. For example, in one commercial run involving the preparation of several thousand gallons of the dipiperazine sulfate, the product was found to have the following properties:

| | |
|---|---|
| Piperazine _____g./100 ml__ | 49.2 |
| pH, 1 part to 5 parts water_____ | 8.9 |
| Color, Pt-Co_____ | >250 |
| Fe _____p.p.m__ | 8.5 |

Attempts to improve significantly the color of the product by repeated filtration were unsuccessful.

In general, it is desirable to provide an aqueous solution of dipiperazine sulfate having a maximum Pt-Co color of 150 as measured by the American Public Health Association Pt-Co color test method. It will be seen, therefore, that the product was unsatisfactory.

EXAMPLE II

Another Prior Art Method of Manufacture

An aqueous solution of dipiperazine sulfate was prepared by dropwise addition of 240 grams of commercial sulfuric acid (containing 18.5 p.p.m. of iron) to 400 grams of piperazine dissolved in 304 grams of water at a temperature between about 40° and 50° C. with no attempt to exclude air during the sulfuric acid addition step.

The aqueous solution of dipiperazine sulfate prepared in this manner had a piperazine content of 53.0 grams per 100 ml. and a color of 250 Pt-Co. Treatment with activated carbon failed to improve the color.

Five hundred and seventeen grams of filtrate which had been treated with activated carbon as described in the preceding paragraph was diluted with 50 grams of water and an additional five grams of charcoal. The slurry was stirred for fifteen minutes and filtered. The color of the filtrate decreased to about 120 Pt-Co. However, a second filtration did not produce a further reduction in color.

This demonstrates the discovery of the present invention that filtration and decoloration is highly effective with aqueous solutions of dipiperazine sulfate containing not more than about 43 grams per 100 ml. of piperazine as compared with the filtration of aqueous solutions containing more than about 50 grams per 100 ml. of piperazine.

EXAMPLE III

Process of the Present Invention

An aqueous solution of dipiperazine sulfate was prepared by adding 240 grams of the sulfuric acid of Example I dropwise to 400 grams of piperazine dissolved in about 365 grams of water while holding the temperature between about 40° and 50° C. A nitrogen purge of the reaction flask was employed during the sulfuric acid addition. The thus-prepared aqueous solution of dipiperazine sulfate had a color of 250 Pt-Co. Fourteen grams of activated carbon were added to this solution and it was filtered at 45° C., utilizing a diatomaceous earth filter aid. The color of the filtered product was within the range of about 50 to 75 Pt-Co. When the solution was concentrated by distillation under a nitrogen blanket to a concentration of about 53 grams of piperazine to 100 ml. of solution, the final product had a color of about 75 to 100 Pt-Co.

EXAMPLE IV

The Need To Exclude Air

Example III was repeated except that a nitrogen purge was not employed and no effort was made to exclude air. The initial product had a color of about 250 Pt-Co and the filtered product had a color of about 50 Pt-Co. The dilute decolorized solution was concentrated by filtration in the presence of an air bleed to provide a final product containing about 53 grams of piperazine per 100 ml. of solution. The color was about 125 to 150 Pt-Co.

As is shown by this example, it is necessary to avoid air contact during processing if discoloration is to be avoided.

EXAMPLE V

To an aqueous solution of 633 grams of piperazine in 493 grams of water, there was added 396 grams of a commercial sulfuric acid containing about 185 p.p.m. of iron, the maximum temperature during the addition not exceeding 60° C. The color of the resulting solution was about 4–5 Gardner. The extreme difference in product color between the aqueous solution of this example and the aqueous solution of Example II is attributable to the difference in iron content of the acids employed.

EXAMPLE VI

The Use of a Perlite-Type Filter Aid Rather Than Diatomaceous Earth-Type Filter Aid To 485.2 grams of dipiperazine sulfate solution containing about 51 grams of piperazine per 100 ml., 62.7 grams of water was added. The diluted solution had a color of 250 Pt-Co. To the diluted solution was added 4.8 grams of activated carbon and 4.8 grams of a perlite-type filter aid. The solution was then filtered and checked for color. The final color of the solution was 35 Pt-Co.

EXAMPLE VII

Concentration of Dipiperazine Sulfate Solution After Decolorizing Treatment

A dipiperazine sulfate solution was prepared by the addition of 720 lb. of 98% sulfuric acid to 1,220 lb. of piperazine dissolved in 177 gallons of water. A nitrogen purge was maintained on the kettle during acid addition and the temperature of the reaction mix did not exceed 52° C. At the completion of the acid addition, the concentration of piperazine was about 44 grams per 100 ml. of solution. The solution was cooled, decolorized and filtered using 6 lb. of activated carbon and 9 lb. of a commercial diatomaceous earth. The solution was heated under a nitrogen purge to a maximum kettle temperature of 120° C., stripping off 400 lb. of water overhead. The final product was 260 gallons of dipiperazine sulfate solution having a piperazine concentration of 51.5 grams per 100 ml. of solution and a solution color of 40 Pt-Co. Yield of piperazine in the final product was 91.8% of the piperazine charged.

A second batch of dipiperazine sulfate solution was prepared by the addition of 781 lb. of 98% sulfuric acid to 1,315 lb. of piperazine dissolved in 190 gallons of water. A nitrogen purge was used during the acid addition and the maximum mix temperature was 55° C. The batch was cooled, decolorized and filtered in the same manner as in the above example. The mix was concentrated by the addition of 710 lb. piperazine and 420 lb. 98% sulfuric acid. A nitrogen purge was also used during this second acid addition and maximum temperature attained during this second reaction was 51° C. The final product consisted of 468 gallons of dipiperazine sulfate solution having a concentration of 52.2 grams per 100 ml. and a solution color of 60 Pt-Co. Yield of piperazine in the final product was 100% based on piperazine charged.

Advantages of the latter procedure for concentrating the product are (a) increased piperazine yield (b) reduced batch cycle time and (c) increased productivity per batch.

It has also been observed that storage of either the intermediate or final solution in contact with air, particularly at temperatures of 50° to 60° C., adversely affects color.

Having thus described our invention, what is claimed is:

1. A method for the manufacture of a low color concentrated aqueous solution of dipiperazine sulfate containing from about 48 to about 60 grams of piperazine per 100 ml. of solution which comprises the steps, conducted in the substantial absence of air, of
    A. Slowly adding sulfuric acid to an aqueous solution of piperazine containing not more than about 46 grams of piperazine per 100 ml. at a temperature of not more than about 60° C. in a total molar ratio of about 0.5 mole of sulfuric acid per mol of piperazine to thereby provide a dilute aqueous solution of dipiperazine sulfate,
    B. Filtering said dilute aqueous solution of dipiperazine sulfate in the presence of a decolorizing agent and filter aid, and
    C. Adjusting the concentration of dipiperazine sulfate to provide an aqueous solution of dipiperazine sulfate containing from about 48 to about 60 grams of piperazine per 100 ml. of solution.

2. A method as in claim 1 wherein the dipiperazine sulfate concentration of the filtered solution is adjusted by distillation to remove excess water.

3. A method as in claim 1 wherein the dipiperazine sulfate concentration is adjusted by adding additional piperazine and concentrated sulfuric acid with agitation in the molar ratio of about 0.5 mole of sulfuric acid per mole of piperazine to provide a final product containing from about 48 to 60 grams of piperazine per 100 ml. of solution.

4. A method as in claim 1 wherein air is excluded by employing a nitrogen blanket.

5. A method as in claim 1 wherein the decolorizing agent is activated carbon and wherein the filter aid is diatomaceous earth.

No references cited.